United States Patent
Fattal et al.

(10) Patent No.: US 12,117,693 B2
(45) Date of Patent: Oct. 15, 2024

(54) ACTIVE EMITTER MULTIVIEW BACKLIGHT, DISPLAY, AND METHOD EMPLOYING A DIFFUSER

(71) Applicant: LEIA INC., Menlo Park, CA (US)

(72) Inventors: David A. Fattal, Menlo Park, CA (US); Thomas Hoekman, Redwood City, CA (US); Ming Ma, Menlo Park, CA (US)

(73) Assignee: LEIA Inc., Menlo Park, CA (US)

( * ) Notice: Subject to any disclaimer, the term of this patent is extended or adjusted under 35 U.S.C. 154(b) by 0 days.

(21) Appl. No.: 18/143,466

(22) Filed: May 4, 2023

(65) Prior Publication Data

US 2023/0276043 A1 Aug. 31, 2023

Related U.S. Application Data

(63) Continuation of application No. PCT/US2021/056901, filed on Oct. 27, 2021.
(Continued)

(51) Int. Cl.
*G02F 1/13357* (2006.01)
*F21V 8/00* (2006.01)
(Continued)

(52) U.S. Cl.
CPC ..... *G02F 1/133606* (2013.01); *G02B 6/0073* (2013.01); *G02B 30/33* (2020.01);
(Continued)

(58) Field of Classification Search
CPC G02B 30/33; G02F 1/133606; G09G 3/3208; G09G 3/3426; G09G 2320/28; H04N 13/349; H04N 13/351
See application file for complete search history.

(56) References Cited

U.S. PATENT DOCUMENTS 6,304,288 B1  10/2001  Hamagishi
7,580,186 B2  8/2009  Mather et al.
(Continued)

FOREIGN PATENT DOCUMENTS

CN  103616767 A  3/2014
JP  2008096765 A  4/2008
(Continued)

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
(Continued)

*Primary Examiner* — Keith G. Delahoussaye
(74) *Attorney, Agent, or Firm* — Schwegman Lundberg & Woessner, P.A.

(57) ABSTRACT

A multiview backlight, multiview display, and method employ arrays of active emitters and a diffuser to provide an effective active emitter from emitted light from each active emitter. The multiview backlight includes an array of active emitters and a diffuser configured to provide effective active emitters having a predetermined size that is between one quarter and two times a size of a light valve of the multiview display. The multiview display includes an array of effective active emitters including active emitters and a diffuser configured to provide output emitted light. The multiview display further includes an array of light valves configured to modulate output emitted light to provide a displayed image. A spacing between effective active emitters is an integer multiple of a spacing between light valves of the multiview display.

20 Claims, 5 Drawing Sheets

Related U.S. Application Data

(60) Provisional application No. 63/111,209, filed on Nov. 9, 2020.

(51) Int. Cl.
  G02B 30/33 (2020.01)
  G09G 3/3208 (2016.01)
  G09G 3/34 (2006.01)
  H04N 13/32 (2018.01)
  H04N 13/349 (2018.01)
  H04N 13/351 (2018.01)

(52) U.S. Cl.
  CPC ......... *G09G 3/3208* (2013.01); *G09G 3/3426* (2013.01); *H04N 13/32* (2018.05); *H04N 13/349* (2018.05); *H04N 13/351* (2018.05); *G09G 2320/028* (2013.01)

(56) References Cited

U.S. PATENT DOCUMENTS

| | | |
|---|---|---|
| 9,128,226 B2 | 9/2015 | Fattal et al. |
| 9,201,210 B2 | 12/2015 | Terajima |
| 9,201,270 B2 | 12/2015 | Fattal et al. |
| 9,279,989 B2 | 3/2016 | Song et al. |
| 9,298,168 B2 | 3/2016 | Taff et al. |
| 9,372,349 B2 | 6/2016 | Brug et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,551,546 B2 | 2/2020 | Fattal |
| 10,630,939 B2 | 4/2020 | Van Os et al. |
| 10,649,128 B2 | 5/2020 | Fattal et al. |
| 10,705,281 B2 | 7/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,884,175 B2 | 1/2021 | Fattal |
| 10,928,564 B2 | 2/2021 | Fattal |
| 10,928,677 B2 | 2/2021 | Aieta et al. |
| 10,969,627 B2 | 4/2021 | Fattal et al. |
| 11,004,407 B2 | 5/2021 | Fattal et al. |
| 11,011,121 B2 | 5/2021 | Fattal et al. |
| 11,016,235 B2 | 5/2021 | Fattal et al. |
| 11,041,988 B2 | 6/2021 | Fattal et al. |
| 11,048,036 B2 | 6/2021 | Ma et al. |
| 11,143,810 B2 | 10/2021 | Fattal et al. |
| 11,143,811 B2 | 10/2021 | Fattal et al. |
| 11,169,391 B2 | 11/2021 | Fattal et al. |
| 11,200,855 B2 | 12/2021 | Fattal |
| 11,307,344 B2 | 4/2022 | Fattal et al. |
| 11,327,337 B2 | 5/2022 | Fattal |
| 11,418,775 B2 | 8/2022 | Fattal |
| 2005/0046951 A1 | 3/2005 | Sugihara et al. |
| 2007/0013624 A1 | 1/2007 | Bourhill |
| 2008/0252955 A1 | 10/2008 | Redert |
| 2008/0285282 A1 | 11/2008 | Karman et al. |
| 2009/0322986 A1 | 12/2009 | Wei et al. |
| 2010/0118218 A1 | 5/2010 | Eichenlaub |
| 2011/0157167 A1 | 6/2011 | Bennett et al. |
| 2012/0200807 A1 | 8/2012 | Wei et al. |
| 2012/0235891 A1 | 9/2012 | Nishitani et al. |
| 2012/0249537 A1 | 10/2012 | Bae et al. |
| 2013/0169518 A1 | 7/2013 | Wu et al. |
| 2014/0085570 A1 | 3/2014 | Kuwata et al. |
| 2014/0160724 A1 | 6/2014 | Lerman |
| 2015/0268479 A1 | 9/2015 | Woodgate et al. |
| 2016/0048060 A1 | 2/2016 | Chen et al. |
| 2016/0349524 A1 | 12/2016 | Pijlman et al. |
| 2016/0379394 A1 | 12/2016 | Kim et al. |
| 2017/0329149 A1* | 11/2017 | Fattal .................. G02B 30/27 |
| 2017/0363794 A1 | 12/2017 | Wan et al. |
| 2018/0011237 A1* | 1/2018 | Fattal .................. G02B 5/18 |
| 2018/0156963 A1 | 6/2018 | Fattal |
| 2019/0017687 A1 | 1/2019 | Zhang |
| 2019/0018186 A1 | 1/2019 | Fattal |
| 2020/0018886 A1 | 1/2020 | Fattal et al. |
| 2020/0051513 A1 | 2/2020 | Fattal et al. |
| 2020/0057343 A1 | 2/2020 | Epstein et al. |
| 2020/0059639 A1 | 2/2020 | Fattal et al. |
| 2020/0158937 A1* | 5/2020 | Chang .................. G02B 6/0088 |
| 2020/0209609 A1 | 7/2020 | Clarke et al. |
| 2020/0228782 A1 | 7/2020 | Fattal |
| 2020/0310135 A1 | 10/2020 | Fattal |
| 2020/0409172 A1 | 12/2020 | Fattal |
| 2021/0157050 A1 | 5/2021 | Fattal |
| 2021/0209980 A1 | 7/2021 | Fattal |
| 2021/0255476 A1 | 8/2021 | Fattal |
| 2021/0311244 A1 | 10/2021 | Fattal et al. |
| 2021/0390914 A1 | 12/2021 | Fattal |
| 2021/0407438 A1 | 12/2021 | Fattal |
| 2022/0044644 A1 | 2/2022 | Fattal |
| 2022/0236596 A1 | 7/2022 | Fattal |
| 2023/0276042 A1 | 8/2023 | Fattal et al. |

FOREIGN PATENT DOCUMENTS

| | | |
|---|---|---|
| JP | 2010044181 A | 2/2010 |
| JP | 2104112147 A | 6/2014 |
| JP | 2020521184 A | 7/2020 |
| JP | 2022520582 A | 3/2022 |
| JP | 2023549749 A | 11/2023 |
| WO | 2012038856 A1 | 3/2012 |
| WO | 2018213100 | 11/2018 |
| WO | WO-2020167374 A1 | 8/2020 |
| WO | 2020185264 A1 | 9/2020 |
| WO | 2022098549 A1 | 5/2022 |
| WO | WO-2022098550 A1 | 5/2022 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) by International Searching Authority (ISA) Korean Intellectual Property Office (KIPO) dated Feb. 21, 2022 (12 pages) for foreign counterpart parent International Application No. PCT/US2021/056901.

"U.S. Appl. No. 18/142,901, Non Final Office Action mailed Jan. 26, 2024", 16 pgs.

"U.S. Appl. No. 18/142,901, Non Final Office Action mailed Jan. 30, 2024", 17 pgs.

"U.S. Appl. No. 18/142,901, Notice of Allowance mailed Apr. 29, 2024", 8 pgs.

"U.S. Appl. No. 18/142,901, Response filed Apr. 9, 2024 to Non Final Office Action mailed Jan. 30, 2024", 9 pgs.

(56) References Cited

OTHER PUBLICATIONS

"International Application Serial No. PCT/US2021/056899, International Preliminary Report on Patentability mailed May 19, 2023", 7 pgs.

"International Application Serial No. PCT/US2021/056899, International Search Report mailed Feb. 21, 2022", 4 pgs.

"International Application Serial No. PCT/US2021/056899, Written Opinion mailed Feb. 21, 2022", 5 pgs.

"International Application Serial No. PCT/US2021/056901, International Preliminary Report on Patentability mailed May 19, 2023", 8 pgs.

"Japanese Application Serial No. 2023-527445, Notification of Reasons for Refusal mailed Apr. 9, 2024", w/ English translation, 18 pgs.

"Japanese Application Serial No. 2023-527445, Search Report mailed Mar. 21, 2024", w/ English translation, 45 pgs.

"U.S. Appl. No. 18/142,901, Corrected Notice of Allowability mailed May 7, 2024", 12 pgs.

\* cited by examiner

US 12,117,693 B2

ACTIVE EMITTER MULTIVIEW BACKLIGHT, DISPLAY, AND METHOD EMPLOYING A DIFFUSER

CROSS-REFERENCE TO RELATED APPLICATIONS

This application is a continuation patent application of and claims priority to International Patent Application No. PCT/US2021/056901, filed Oct. 27, 2021, which claims the benefit of priority to U.S. Provisional Patent Application Ser. No. 63/111,209, filed Nov. 9, 2020, the entirety of each of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
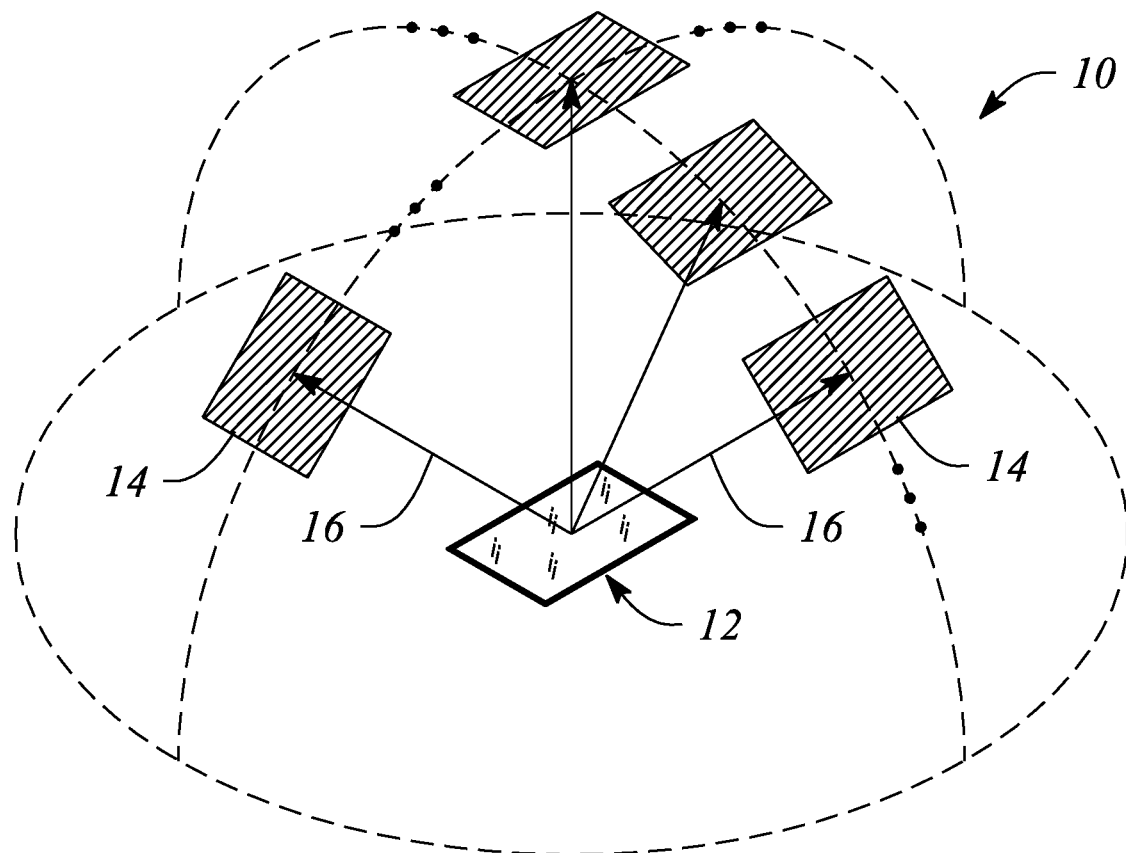
FIG. 1A illustrates a perspective view of a multiview display 10 in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview backlight and a multiview display that utilizes the multiview backlight that employ a diffuser to selectively diffuse light emitted by an array of active emitters. In particular, embodiments consistent with the principles described herein provide a multiview backlight employing an array of active emitters and a diffuser configured to diffuse the emitted light from an active emitter of the active emitter array. The diffuser, in turn, is configured to provide an effective active emitter that is a diffused image of the active emitter. The effective active emitter provided by the diffuser has a predetermined size that is configured to provide a plurality of directional light beams. According to various embodiments, different principal angular directions of the directional light beams provided by the effective active emitter correspond to directions of various different views of a multiview display or equivalently of a multiview image displayed by the multiview display. According to various embodiments, the predetermined size is provided by a 'strength' of the diffuser that is selected based on an actual size of the active emitter and a spacing between the active emitter and a location of the effective active emitter. Further, selective activation of a first active emitter array and a second active emitter array may facilitate reconfiguration of the multiview backlight to provide either directional light beams associated with a multiview display or light consistent with a two-dimensional (2D) display, according to various embodiments. The directional light beams may be or represent a lightfield, for example. As a result, a multiview display that employs the multiview backlight may be switched between a multiview mode and a 2D mode by the selective activation of the first and second active emitter arrays.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast and herein, a 'multiview display' is defined as an electronic display or display system configured to provide different views of a multiview image in or from different view directions. In particular, the different views may represent different perspective views of a scene or object of the multiview image. Uses of multiview backlighting and multiview displays applicable to the display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10 in an example, according to an embodiment consistent with the principles described herein. As illustrated in FIG. 1A, the multiview display 10 comprises a screen 12 configured to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
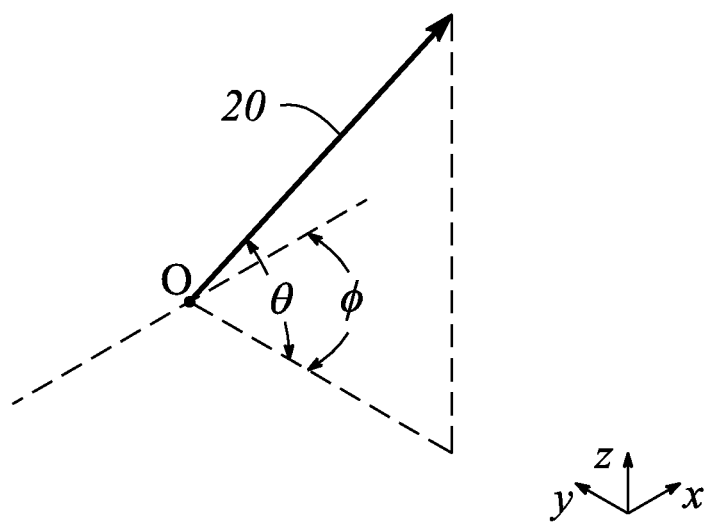
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

The term 'multiview' as used in the terms 'multiview image' and 'multiview display' is defined herein as a plurality of views representing different perspectives or including angular disparity between views of the view plurality. In addition, herein the term 'multiview' explicitly includes two or more different views (e.g., a minimum of three views and generally more than three views), by definition herein. In some embodiments, 'multiview display' as employed herein may be used to explicitly distinguish from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing pixels of views in each of a similar plurality of different views of a multiview display. In particular, a multiview pixel may have individual view pixels corresponding to or representing a particular view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels corresponding to pixels located at $\{x_1, y_1\}$ in each of the different views of a multiview image, while a second multiview pixel may have individual view pixels corresponding to pixels located at $\{x_2, y_2\}$ in each of the different views, and so on. View pixels, in turn, are equivalent to light valves of an array of light valves of the multiview display, by definition herein. As such, the terms 'view pixel' and 'light valve' may be used interchangeably herein unless a distinction is necessary for proper understanding.

Herein, an 'active emitter' is defined as an active source of light (e.g., an optical emitter configured to produce and emit light when activated). As such, an active emitter does not receive light from another source of light, by definition. Instead, the active emitter directly generates light when activated. The active emitter may be activated by applying a power source such as a voltage or a current, by definition herein. For example, the active emitter may comprise an optical emitter such as a light emitting diode (LED) that emits light when activated or turned on. The LED may be activated by applying a voltage to terminals of the LED, for example. In particular, herein the light source may be substantially any active source of light or comprise substantially any active optical emitter including, but not limited to, one or more of a light emitting diode (LED), a laser, an organic light emitting diode (OLED), a polymer light emitting diode, a plasma-based optical emitter, a miniLED (mLED), and a microLED (μLED). The light produced by the active emitter may have a color (i.e., may include a particular wavelength of light), or may be a plurality or range of wavelengths (e.g., polychromatic light or white light). Different colors of light provided or produced by an active emitter may include, but are not limited to, primary colors (e.g., red, green, blue), for example. By definition herein, a 'color emitter' is an active emitter that provides light having a color. In some embodiments, the active emitter may comprise a plurality of active emitters. For example, the active emitter may include a set or group of active emitters. In some embodiments, at least one of the active emitters in the set or group of active emitters may generate light having a color, or equivalently a wavelength, that differs from a color or wavelength of light produced by at least one other optical emitter of the plurality.

Further by definition herein, the term 'broad-angle' as in 'broad-angle emitted light' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (100°). Alternatively, the broad-angle emitted light may have an angular range that is greater than plus and minus forty-five degrees (e.g., >±45°) relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°). A 'broad-angle backlight' is a backlight configured to provide broad-angle emitted light, by definition herein.

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an active emitter' means one or more arrays and as such, 'the active emitter' means 'the active emitter(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
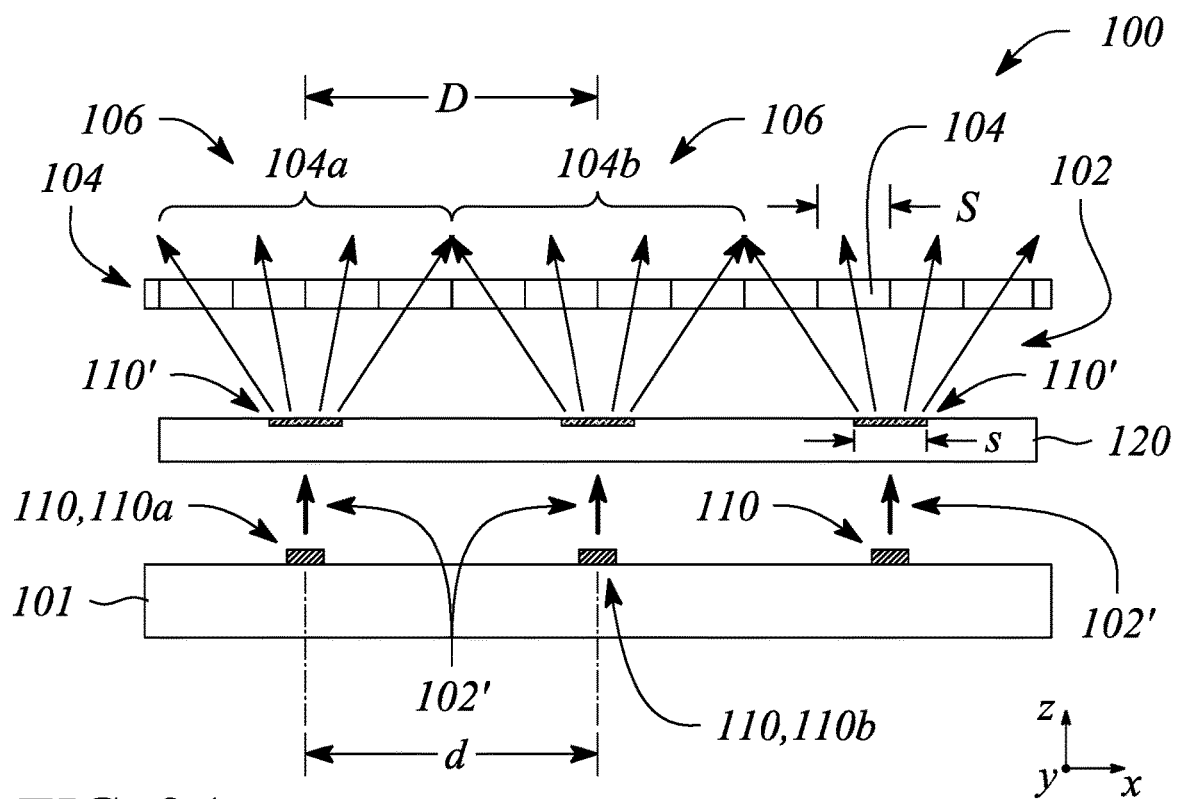
FIG. 2A illustrates a cross-sectional view of a multiview backlight in an example, according to an embodiment consistent with the principles described herein.
Figure 2B:
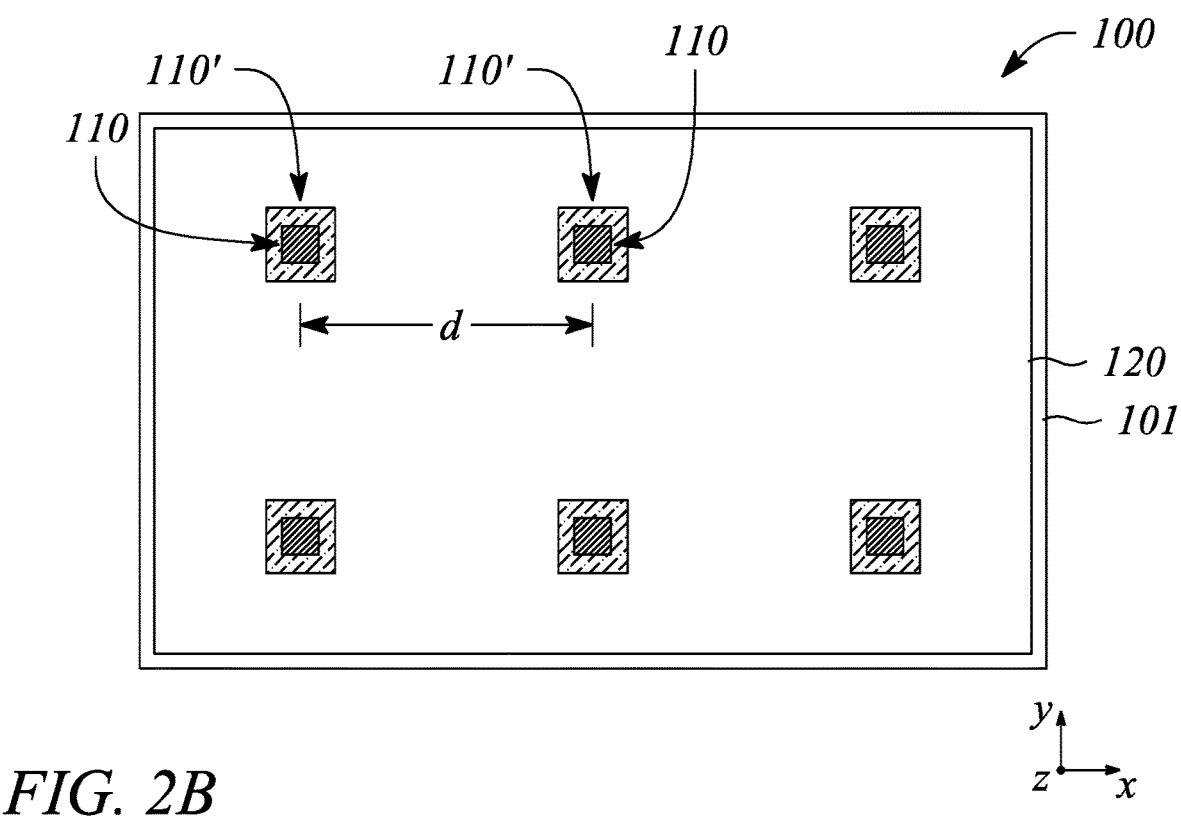
FIG. 2B illustrates a plan view of a multiview backlight in an example, according to an embodiment consistent with the principles described herein.
Figure 2C:
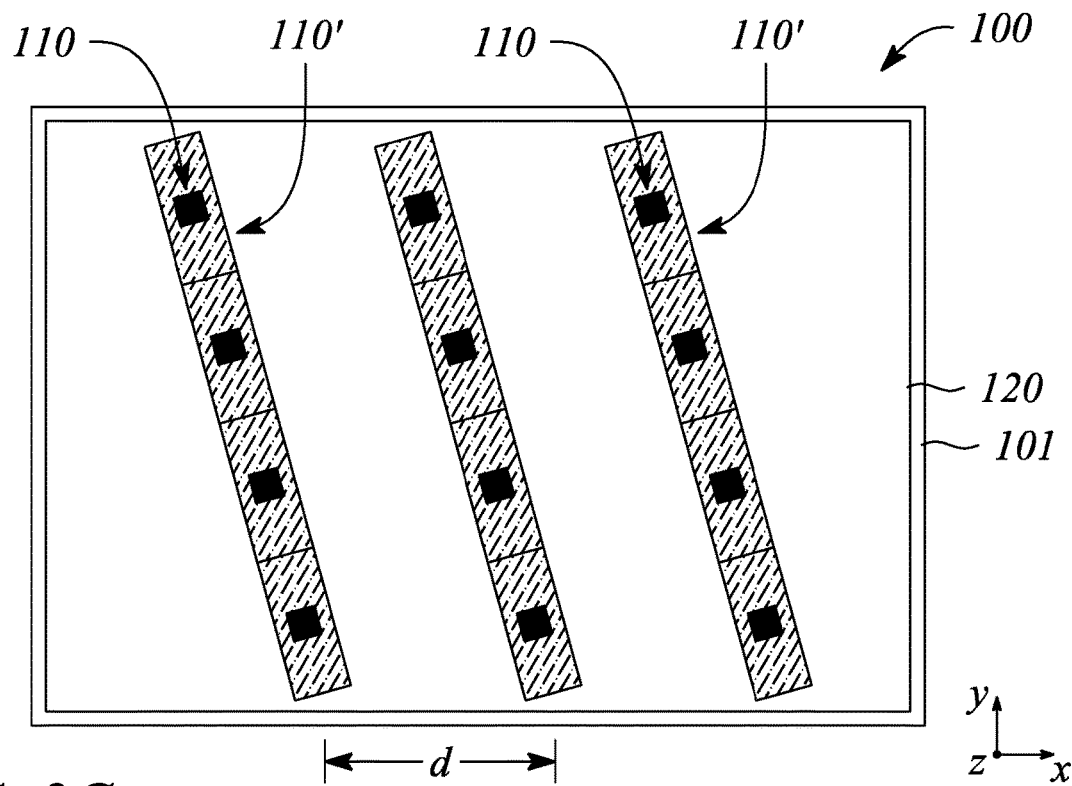
FIG. 2C illustrates a plan view of a multiview backlight in an example, according to another embodiment consistent with the principles described herein.

According to some embodiments of the principles described herein, a multiview backlight is provided. FIG. 2A illustrates a cross-sectional view of a multiview backlight 100 in an example, according to an embodiment consistent with the principles described herein. FIG. 2B illustrates a plan view of a multiview backlight 100 in an example, according to an embodiment consistent with the principles described herein. FIG. 2C illustrates a plan view of a multiview backlight 100 in an example, according to another embodiment consistent with the principles described herein. The multiview backlight 100 is configured to emit or provide directional light beams 102. According to various embodiments, the directional light beams 102 provided by the multiview backlight 100 have directions corresponding to view directions of a multiview display that employs the multiview backlight 100 or equivalently view directions of a multiview image displayed by the multiview display. In some embodiments, the directional light beams 102 may be or represent a lightfield. The side view of FIG. 2A also illustrates an array of light valves 104 that may be part of the multiview display that employs the multiview backlight 100.

The multiview backlight 100 illustrated in FIGS. 2A-2C comprises a first array of active emitters 110 disposed on a planar substrate 101 and configured to provide emitted light 102'. According to various embodiments, active emitters 110 of the first active emitter array are spaced apart from one another on the planar substrate 101. In particular, active emitters 110 of the first active emitter array may be spaced apart by a spacing that corresponds to a spacing between multiview pixels or equivalently sets of light valves of a light valve array of a multiview display that employs the multiview backlight 100, as described in more detail below. For example, FIG. 2A illustrates a spacing d between adjacent active emitters 110 that corresponds to a spacing D between multiview pixels 106 or equivalently sets of the light valves 104 of the array of light valves 104, as illustrated.

In some embodiments, the active emitters 110 may be arranged in a two-dimensional (2D) array (e.g., a rectangular array) having rows and columns. For example, FIG. 2B illustrates the first active emitter array arranged as a 2D array in which the active emitters 110 are disposed on the planar substrate as a rectangular array of spaced-apart active emitters 110. FIG. 2B also illustrates the spacing d between active emitters 110 that corresponds to the spacing of multiview pixels 106. In some embodiments, the active emitter spacing d as well as the multiview pixel spacing D may be in each of two orthogonal directions of the 2D array, e.g., as illustrated in FIG. 2B.

In another example, active emitters 110 of the first active emitter array may be arranged as plurality of parallel columns distributed across the planar substrate 101, as illustrated in FIG. 2C. When arranged as parallel columns the spacing d may be between adjacent columns, as illustrated in FIG. 2C. In some embodiments (e.g., as illustrated in FIG. 2C), the columns may be 'slanted columns', i.e., columns that are slanted relative to one or both of an edge of the planar substrate 101 or relative to an arrangement of light valves in a light valve array (not illustrated in FIG. 2C). In yet other embodiments (not illustrated), active emitters 110 of the first active emitter array may be arranged as a one-dimensional (1D) such as a linear array.

As illustrated in FIGS. 2A-2C, the multiview backlight 100 further comprises a diffuser 120. The diffuser 120 may comprise a sheet, film, or layer located adjacent to an output of the active emitters 110 of the first active emitter array. For example, the diffuser 120 may be located between the active emitters 110 of the first active emitter array and the array of light valves 104, as illustrated in FIG. 2A.

Any of a variety of diffusers or diffuser layers may be used as the diffuser 120. For example, the diffuser 120 may be based on a volumetric or bulk diffuser in which scattering is provided by embedded scattering centers having a variable characteristic such as, but not limited to, one or more of scattering center density, scattering center size and scattering center distribution. In another example, the diffuser 120 may be a surface diffuser configured to provide scattering or diffusion based on variable surface roughness, a prismatic array, or a lenticular array. A lenticular array may provide a highly anisotropic or substantially one-dimensional (1D) diffusion, for example. In yet other embodiments, the diffuser 120 may be a polymer-dispersed liquid crystal (PDLC) diffuser or a diffuser based on another technology including, but not limited to, electrophoretics or electrowetting. In these embodiments, the diffuser 120 may be switchable, for example. Moreover, the diffuser 120 may have a different diffusion strength or a different diffusion kernel in different directions across the diffuser 120 (e.g., orthogonal directions).

According to various embodiments, the diffuser 120 is configured to provide an effective active emitter 110' from or using the emitted light 102' provided by each active emitter 110 of the first active emitter array. That is, the diffuser 120 is configured to receive the emitted light 102' and diffuse or spread out the received emitted light 102' to provide light as or in the form of the effective active emitter 110'. In turn, the effective active emitters 110' provided by the diffuser 120 are configured to provide or emit light that mimics light emitted by an active emitter having the size of the effective active emitter 110'. For example, the effective active emitter 110' may be provided at or in a vicinity of a surface of the diffuser 120. Further, as illustrated in FIG. 2A, the effective active emitters 110' at the diffuser surface are configured to emit the light comprising the directional light beams 102 having directions corresponding to the view directions of a multiview display that employs the multiview backlight 100, according to various embodiments.

According to various embodiments, the diffuser 120 is configured to provide the effective active emitter 110' having a predetermined size. In particular, the diffuser 120 is configured to expand an apparent area of size of an active emitter 110 of the first active emitter array such that the effective active emitter 110' has the predetermined size. In some embodiments, the diffuser may provide the effective active emitter 110' having a predetermined size that is between one quarter and two times a size of a light valve of a multiview display that employs the multiview backlight 100. In embodiments in which the active emitters 110 are arrange in parallel columns, the predetermined size of the effective active emitters 110' provided by the diffuser 120 is in a width direction across the parallel columns. For example, the predetermined size may be in an x-direction where the parallel columns are substantially in the y-direction, e.g., as illustrated in FIG. 2C. In some of these embodiments, the diffuser 120 may be configured to provide another size of the effective active emitters 110' along a length of the columns that is comparable to a spacing between active emitters 110 along the length of the column, as illustrated in FIG. 2C.

According to some embodiments, the multiview backlight 100 may further comprise a second array of active emitters. As with the first array of active emitters 110, active emitters of the second active emitter array are also configured to emit light. In addition, the diffuser 120 is further configured to diffuse the emitted light 102" provided by the active emitters of the second active emitter array, according to some embodiments. The emitted light 102', 102" provided by the diffuser 120 from light emitted by a combination of the first and second active emitter arrays may be or represent broad-angle light, according to some embodiments.

Figure 3A:
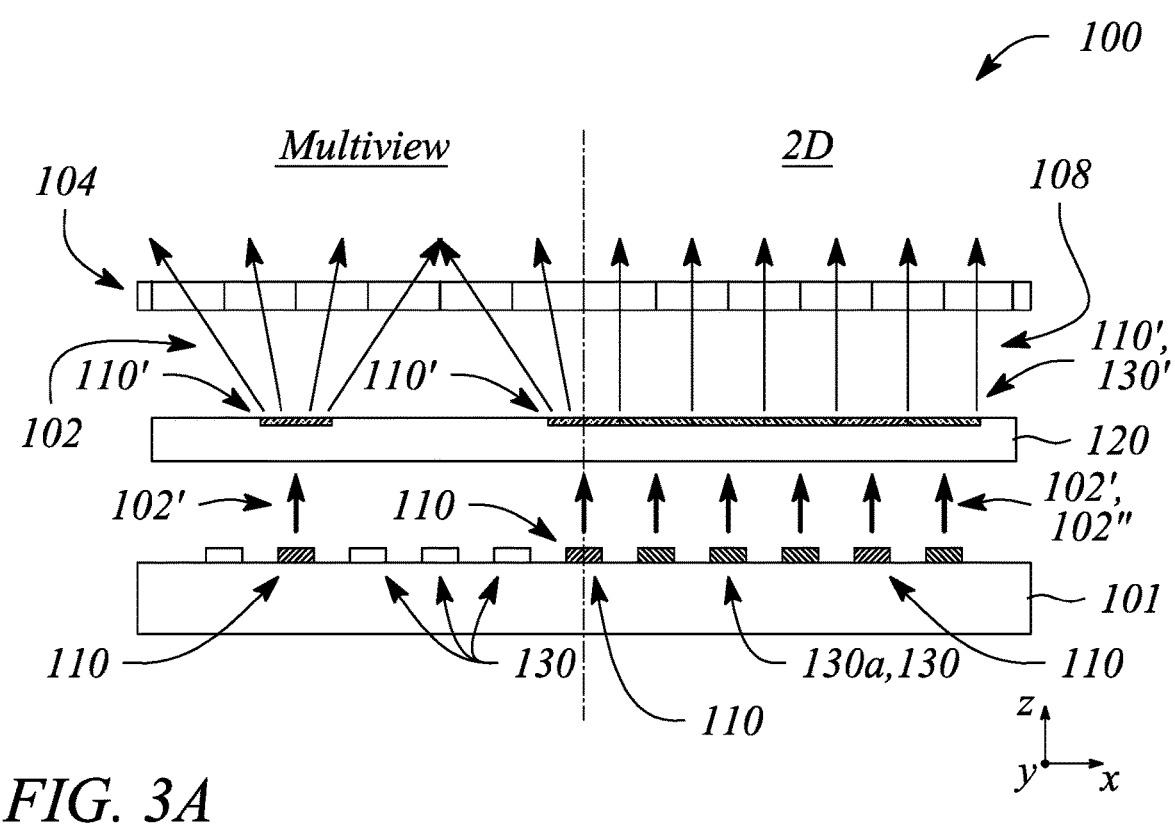
FIG. 3A illustrates a cross-sectional view of a multiview backlight in an example, according to an embodiment of the principles described herein.
Figure 3B:
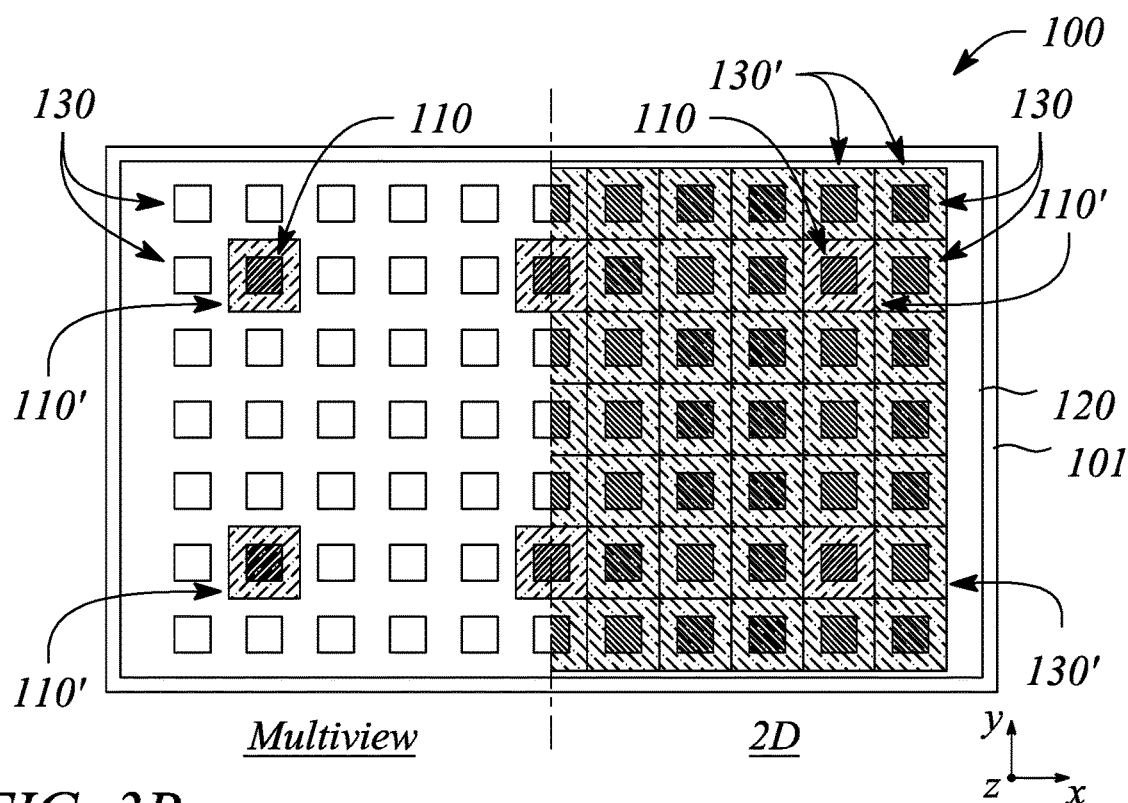
FIG. 3B illustrates a plan view of a multiview backlight in an example, according to an embodiment consistent with the principles described herein.
Figure 3C:
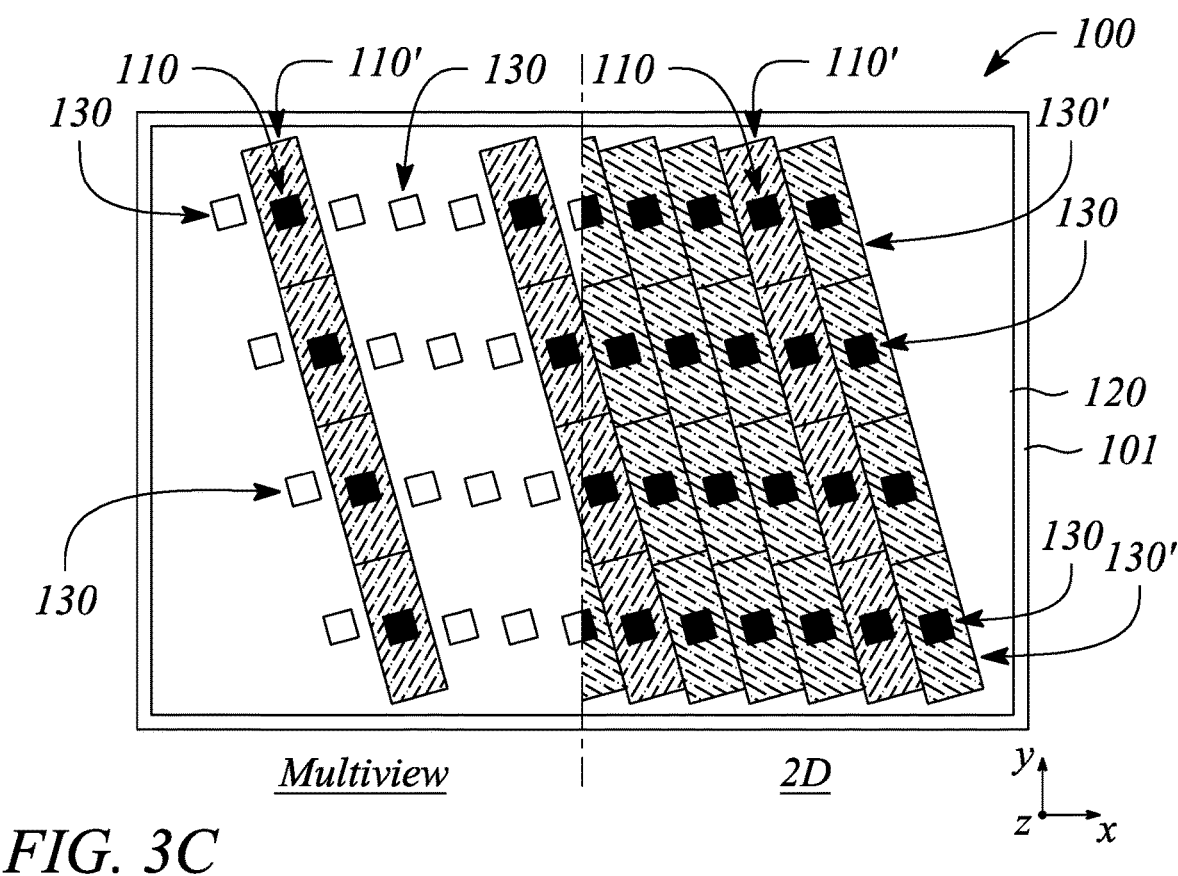
FIG. 3C illustrates a plan view of a multiview backlight in an example, according to another embodiment consistent with the principles described herein.

FIG. 3A illustrates a cross-sectional view of a multiview backlight 100 in an example, according to an embodiment consistent with the principles described herein. FIG. 3B illustrates a plan view of a multiview backlight 100 in an example, according to an embodiment consistent with the principles described herein. FIG. 3C illustrates a plan view of a multiview backlight 100 in an example, according to another embodiment consistent with the principles described herein. As illustrated in FIGS. 3A-3C, the multiview backlight 100 comprises the first array of active emitters 110 and the diffuser 120. The multiview backlight 100 illustrated in FIGS. 3A-3C further comprises a second array of active emitters 130 disposed on the planar substrate 101 between active emitters 110 of the first active emitter array. FIG. 3A-3C also illustrates the array of light valves 104, e.g., light valves 104 that are part of the multiview display that employs the multiview backlight 100.

In some embodiments, the active emitters 130 of the second active emitter array are disposed about halfway between the active emitters 110 of the first active emitter array. In other embodiments, a spacing between active emitters 130 of the second active emitter array and also between the active emitters 130 and active emitters 110 of the first active emitter array is an integer multiple of a spacing between light valves of a light valve array of a multiview display. For example, the active emitters 130 of the second active emitter array may be spaced apart from one another and from the active emitters 110 of the first active emitter array by a distance corresponding to a spacing between or pitch of the light valves of the light valve array. When the active emitters 110, 130 of the first and second active emitter arrays are arranged as columns, columns of the second active emitter array are disposed between and may alternate with the columns of the first active emitter array, in some embodiments. In various embodiments, the columns of active emitters 130 of the second active emitter array may have different spacings such as, but not limited to, halfway between columns of active emitters 110 of the first active emitter array and a spacing corresponding to the light valve pitch.

FIG. 3A also illustrates an active emitter 130a of the second active emitter array that is located about halfway between active emitters 110 of the first active emitter array. FIG. 3A also illustrates the active emitters 130 of the second active emitter array having a spacing or pitch corresponding to the spacing or pitch of the light valves 104 in the light valve array, by way of example and not limitation.

FIG. 3B illustrates the active emitters 130 of the second active emitter array disposed between the active emitters 110 of the first active emitter array in both a row direction and a column direction across the planar substrate 101. In FIG. 3B, some of the active emitters 130 of the second active emitter array are about halfway between active emitters 110 of the first active emitter array both along rows and columns of the first active emitter array and in a diagonal direction. Further, FIG. 3B illustrates additional active emitters 130 of the second active emitter array distributed across the planar substrate 101, e.g., such that active emitters 110, 130, of the first and second active emitter array, in combination, have a pitch corresponding to the light valve pitch (at least in the x-direction, as illustrated).

FIG. 3C illustrates active emitters 130 arranged as columns of active emitters 130 disposed between adjacent columns of active emitters 110 of the first active emitter array across the planar substrate 101. In addition, FIG. 3C illustrates the columns of active emitters 110, 130 as slanted columns, by way of example and not limitation. As with the active emitters 130 of FIG. 3B, the columns of active emitters 130 of the second active emitter array may have a spacing corresponding to the light valve pitch, as illustrated in FIG. 3C.

FIGS. 3A-3C also illustrate an effective active emitter 130' provided by the diffuser 120 from or using light emitted by the active emitters 130 of the second active emitter array. When the active emitters 130 have spacing corresponding to the light valve pitch, the effective active emitters 130' in combination with the effective active emitters 110' may provide a substantially uniform source of illumination at a surface of the diffuser, at least when active emitters 110, 130 of both the first and second active emitter arrays are activated to emit light. For example, a combination of the effective active emitters 110', 130' may provide continuous or substantially continuous surface illumination at the diffuser surface, as illustrated.

According to some embodiments, the active emitters 110 of the first active emitter array are configured to provide emitted light 102' during a first or 'multiview' mode of the multiview backlight 100. In particular, during the multiview mode the active emitters 110 are activated or turned on and emit light, while the active emitters 130 of the second active emitter array (if present) are inactivated or turned off and do not emit light. As such, effective active emitters 110' provide by the diffuser 120 from the light emitted by the first active emitter array provide the directional light beams 102, e.g., to be modulated by the light valves 104 as the multiview image. FIGS. 3A-3C illustrate the multiview mode with active emitters 110 activated to provide emitted light 102' and the active emitters 130 inactivated. Further, the diffuser 120 may provide effective active emitters 110' from the emitted light 102' provided by the active emitters 110 of the first active emitter array during the multiview mode or equivalently when active emitters 130 of the second active emitter array are not present.

In some embodiments, active emitters 110, 130 of both the first active emitter array and the second active emitter array are configured to provide emitted light 102', 102" (as combined emitted light) during a second or 'two-dimensional' (2D) mode of the multiview backlight 100. In particular, during the 2D mode both the active emitters 110 and the active emitters 130 are activated and emit light. As illustrated in FIGS. 3A-3C, active emitters 110 of the first active emitter array provide emitted light 102' and active emitters 130 of the second active emitter array provide emitted light 102" during the 2D mode. The combined emitted light 102', 102" then passes through and is diffused by the diffuser 120 to provide output light 108 at or from the effective active emitters 110', 130'. As such, during the 2D mode, the diffuser 120 provides effective active emitters 110', 130' by diffusing the combined emitted light 102', 102" provided by both of the active emitters 110 of the first active emitter array and the active emitters 130 of the second active emitter array. The output light 108 during the 2D mode may be modulate by the light valve array to provide a 2D image, for example.

As mentioned above, FIGS. 2A and 3A both illustrate an array of light valves 104 as well as multiview pixels 106 for the purpose of facilitating discussion herein. The illustrated light valve array may be part of a multiview display that employs the multiview backlight 100, for example. As illustrated, light valves 104 of the light valve array are configured to modulate the directional light beams 102. Further, different ones of the directional light beams 102 having different principal angular directions pass through and may be modulated by different ones of the light valves 104 in the light valve array, as illustrated. The light valves 104 are also configured to modulate diffuse light provided by the active emitter 110, 130 of a combination of the first and second active emitter arrays, for example during a 2D mode of the multiview backlight 100.

By definition herein, a light valve 104 of the light valve array may correspond to a view pixel of the multiview display, while a set of the light valves 104 or set of view pixels may correspond to a multiview pixel 106. In particular, a different set of light valves 104 of the light valve array may be configured to receive and modulate the directional light beams 102 from different ones of the active emitters 110 of the first active emitter array. As such, there may be one unique set of light valves 104 (or multiview pixel 106) for each active emitter 110, e.g., as illustrated in FIG. 2A with respect to active emitters 110. In various embodiments, different types of light valves may be employed as the light valves 104 of the light valve array including, but not limited to, one or more of liquid crystal light valves, electrophoretic light valves, and light valves based on electrowetting.

Further, in FIG. 2A, a size S of a light valve 104 may correspond to an aperture size of the light valve 104 in the light valve array, as illustrated. In other examples, the light valve size may be defined as a distance (e.g., a center-to-center distance) between adjacent light valves 104 of the light valve array. For example, an aperture of the light valves 104 may be smaller than the center-to-center distance between the light valves 104 in the light valve array. Thus, the light valve size may be defined as either the size of the light valve 104 or a size corresponding to the center-to-center distance between the light valves 104, among other definitions. Also, in FIG. 2A, a size s of the effective active emitters 110' provided by the diffuse 120 from light emitted by the first active emitter array is illustrated as comparable to the light valve size S.

In some embodiments (e.g., as illustrated in FIG. 2A), an inter-emitter distance (e.g., center-to-center distance) between a pair of adjacent active emitters 110 may be equal to an inter-pixel distance (e.g., a center-to-center distance) between a corresponding pair of adjacent multiview pixels 106, e.g., represented by light valve sets. For example, as illustrated in FIG. 2A, a center-to-center distance d between an active emitter 110a of the first active emitter array and another active emitter 110b of the first active emitter array is substantially equal to a center-to-center distance D between a first light valve set 104a and the second light valve set 104b, where each light valve set 104a, 104b represents a multiview pixel 106. In other embodiments (not illustrated), the relative center-to-center distances of pairs of columns of active emitters 110a, 110b and corresponding light valve sets 104a, 104b may differ, e.g., the pairs of columns of active emitters 110a, 110b may have an inter-element spacing (i.e., center-to-center distance d) that is one of greater than or less than a spacing (i.e., center-to-center distance D) between light valve sets representing multiview pixels 106. Further, when columns of active emitters 110 are used, the multiview image provided by a multiview display that employs the multiview backlight 100 may be a so-called 'horizontal-parallax-only' (HPO) multiview image having a plurality of views in only one direction, i.e., in a direction perpendicular to or across the columns.

According to some embodiments, an active emitter 110, 130 of one or both of the first active emitter array and the second active emitter array may comprise either a mini light emitting diode (miniLED or mLED) or a micro light emitting diode (microLED or µLED). Herein, a miniLED is a light emitting diode having dimensions that are less than about 0.5 millimeters (mm). For example, a miniLED may have dimensions in the range of about 75 micrometers (µm) to about 300 µm. Herein, µLED is defined as a microscopic light emitting diode (LED), i.e., an LED having microscopic dimensions that are less than 100 µm and more generally less than about 75 µm. For example, a microLED may have a size of about 10-50 µm. In some embodiments, the miniLED or µLED may comprise a plurality of miniLEDs or µLEDs that, when combined, function together as a unit as the active emitter 110, 130.

In some embodiments, a miniLED or a µLED may comprise a plurality of different regions, each of the different regions (or equivalently the plurality of miniLEDs or µLEDs) being configured to provide a different color of light. For example, the miniLED or µLED may comprise three regions, a first region being configured to provide red light, a second region being configured to provide green light, and a third region being configured to provide blue light. As such, the miniLED or µLED may be configured to selectably provide red, green, or blue light or any combination thereof (e.g., white light).

According to some embodiments, an active emitter 110, 130 of one or both of the first active emitter array and the second active emitter array may comprise an organic light emitting diode (OLED). As defined herein, an OLED is an emitter having an emissive electroluminescent film or layer comprising an organic compound configured to emit light in response to an electric current or similar electrical stimulus. As with the miniLED and µLED, the OLED may comprise a plurality of OLEDs that, when combined, function together as a unit as the active emitter 110, 130. In some embodiments, the OLED may comprise a plurality of different regions, each of the different regions being configured to provide a different color of light. For example, the OLED may comprise three regions, a first region being configured to provide red light, a second region being configured to provide green light, and a third region being configured to provide blue light. As such, the OLED serving as the active emitter 110, 130 may be configured to provide by selection red, green, or blue light or any combination thereof (e.g., white light). In yet other embodiments, another type of active optical emitter may be used as the active emitter 110, 130 such as, but not limited to, a high intensity LED and a quantum dot LED.

In some embodiments, the active emitters 110, 130 may be configured to provide light that is substantially monochromatic having a particular color (i.e., the light may include a particular wavelength of light). In other embodiments, the active emitter 110, 130 may be configured to provide polychromatic light such as, but not limited to, white light, that includes a plurality or range of wavelengths. For example, the active emitter 110, 130 may be configured to provide one or more of red light, green light, blue light, or a combination thereof. In another example, the active emitter 110, 130 may be configured to provide light that is substantially white light (i.e., the active emitter 110, 130 may be a white µLED or white OLED).

In some embodiments, the active emitter 110, 130 may include a micro-lens, a diffraction grating, or another optical film or component configured to provide one or both of collimation (e.g., according to a collimation factor) and polarization control of emitted light or equivalently of the directional light beams 102. The micro-lens, the diffraction grating, or the other optical film or component may also or alternatively be configured to control a direction of the directional light beams 102. Alternatively, one or both of the collimation and polarization control may be provided by an optical layer or film between the active emitter arrays and the light valve array, for example.

The first active emitter array and the second active emitter arrays may be independently controlled, activated, or powered to provide local dimming and also to enable switching between directional light beam production by the effective active emitters using light emitted by first active emitter array and diffuse light provided by a combination of the first and second active emitter arrays, according to some embodiments. In particular, in some embodiments, the active emitters 110 of the first active emitter array may be configured to provide by selective activation the directional light beams 102, e.g., during a the multiview mode of the multiview backlight. Similarly, the active emitters 110, 130 of both of the first and second active emitter arrays may be configured to provide emitted light by selective activation that is, in turn, diffused by the diffuser, e.g., during a 2D mode of the multiview backlight 100.

Referring again to FIGS. 2A and 3A, the multiview backlight 100 may further comprise a planar substrate, e.g., the planar substrate 101, in some embodiments. In particular, the active emitters 110 of the first active emitter array as well as the active emitters 130 of second active emitter array may be disposed on and spaced apart across a surface of the planar substrate 101, as described above. The planar substrate 101 may further comprise electrical interconnects to provide power to the active emitters 110, 130. In some embodiments, the planar substrate 101 is configured to be optically transparent or at least substantially optically transparent (i.e., may be a planar transparent substrate). For example, the planar substrate 101 may comprise an optically transparent material capable of transmitting light from a first side to a second side of the planar substrate 101. Further, electrical interconnects may be optically transparent, in some embodiments. Moreover, a combination of the first active emitter array and the second active emitter array, when present, and the planar substrate 101 (e.g., along with the electrical interconnects) may be configured to be optically transparent, in some embodiments.

Figure 4:
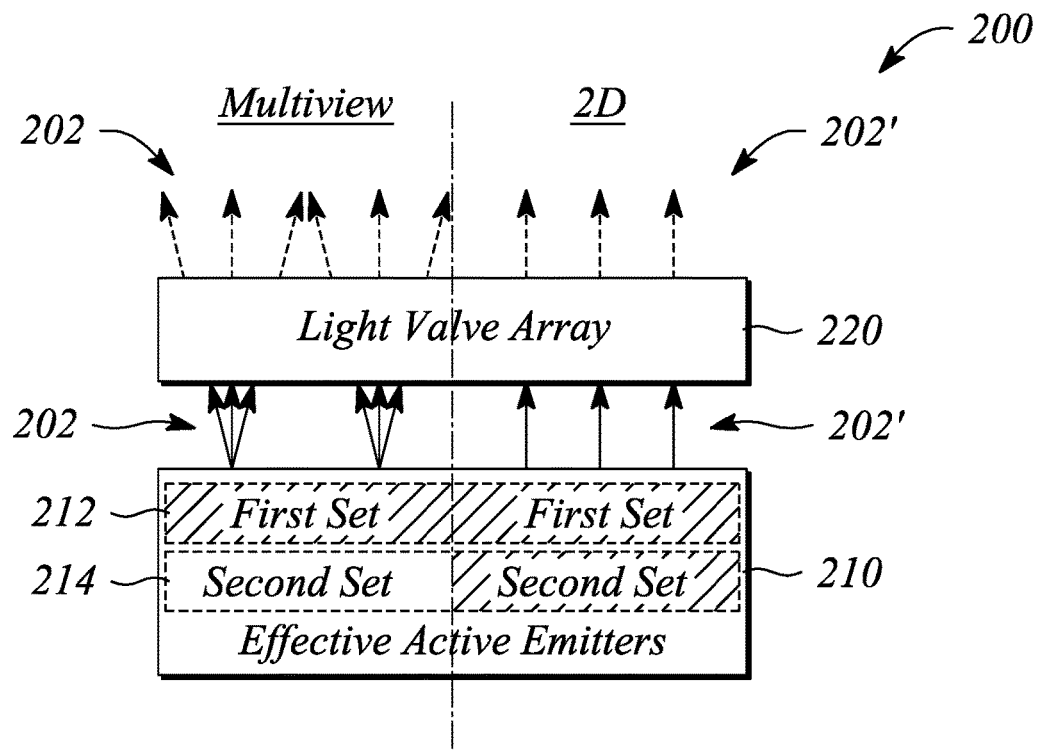
FIG. 4 illustrates a block diagram of a multiview display in an example, according to an embodiment consistent with the principles described herein.

In accordance with some embodiments of the principles described herein, a multiview display is provided. The multiview display is configured to display a multiview image, according to various embodiments. FIG. 4 illustrates a block diagram of a multiview display 200 in an example, according to an embodiment consistent with the principles described herein.

As illustrated, the multiview display 200 comprises an array of effective active emitters 210. Each effective active emitter 210 of the effective active emitter array comprises an active emitter on a planar substrate configured to emit light. According to some embodiments, the active emitter of the effective active emitter 210 may be substantially similar to the active emitter 110 of the first array of active emitters described above with respect to the multiview backlight 100.

Each effective active emitter 210 of the effective active emitter array further comprises a diffuser configured to diffuse the emitted light from the active emitter which, in turn, exits the diffuser as output emitted light 202 from the effective active emitters 210. According to some embodiments, the diffuser may be substantially similar to the diffuser 120 of the above-described multiview backlight 100. In particular, the diffuser is configured to determine a size of the effective active emitter 210, as described above.

As illustrated in FIG. 4, the multiview display 200 also comprises an array of light valves 220 configured to modulate the output emitted light 202 from the effective active emitter array and provide a displayed image. In particular, the displayed image may be the multiview image when the light valves 220 modulate directional light beams provided by the effective active emitters 210, in some embodiments. In some embodiments, the light valves 220 may be substantially similar to the light valves 104, as described above. According to some embodiments, diffuser of the effective active emitter 210 is configured to determine a size of the effective active emitter 210 to be between one quarter and two times a size of a light valve 220 of the light valve array. In some embodiments, a spacing between effective active emitters 210 is an integer multiple of a spacing between light valves 220 of the light valve array.

According to some embodiments, the effective active emitter array comprises a first set 212 of effective active emitters 210 spaced apart from one another by a distance corresponding to a spacing between multiview pixels of the multiview display. In these embodiments, each of the effective active emitters 210 of the first set 212 of effective active emitters 210 may be configured to provide output emitted light 202 comprising a plurality of directional light beams having directions corresponding to view directions of the multiview display. The output emitted light 202 from the effective active emitters 210 of the first set 212 that comprises the plurality of directional light beams may be or represent a lightfield, for example. Also in these embodiments, the displayed image provided by the modulation of the output emitted light 202 from the first set 212 of effective active emitters 210 is a multiview image.

According to some embodiments, the multiview display 200 further comprises a second set 214 of effective active emitters 210 between effective active emitters 210 of the first set 212. In these embodiments, the displayed image provided by modulation of the combined output emitted light 202' provided by a combination of the first set 212 and the second set 214 of effective active emitters is a two-dimensional (2D) image. The effective active emitters 210 of the second set 214 of effective active emitters 210 are spaced apart from one another and adjacent to the effective active emitters 210 of the first set 212 of effective active emitters 210 by a spacing corresponding to the spacing of light valves of the light valve array.

According to some embodiments, effective active emitters 210 of the effective active emitter array are arranged in parallel columns across the planar substrate. In these embodiments, the size of effective active emitters may be a width of the parallel columns, i.e., the size may be in a width direction across the parallel columns. Further, the diffuser may be configured to determine another size of the effective active emitters along a length of the columns that is comparable to a spacing between active emitters along the length of the column, in some embodiments.

According to some embodiments, the first set 212 of effective active emitters 210 may be activated during a multiview mode of the multiview display 200. The multiview mode is illustrated on a left side of FIG. 4. During the multiview mode, the multiview display 200 may provide a multiview image. According to some embodiments, the both the first set 212 of effective active emitters 210 and the second set 214 of effective active emitter 210 may be activated to during a two-dimensional (2D) mode of the multiview display 200. The 2D mode is illustrated on a right side of FIG. 4. During the 2D mode, the multiview display 200 may provide a 2D image. In FIG. 4, activation of the first set 212 of effective active emitters 210 during the multiview mode and activation of both the first and second sets 212, 214 of effective active emitters 210 is illustrated using cross hatching. Arrows having dashed lines in FIG. 4 illustrate modulated output emitted light 202 and modulated combined output emitted light 202'.

Figure 5:
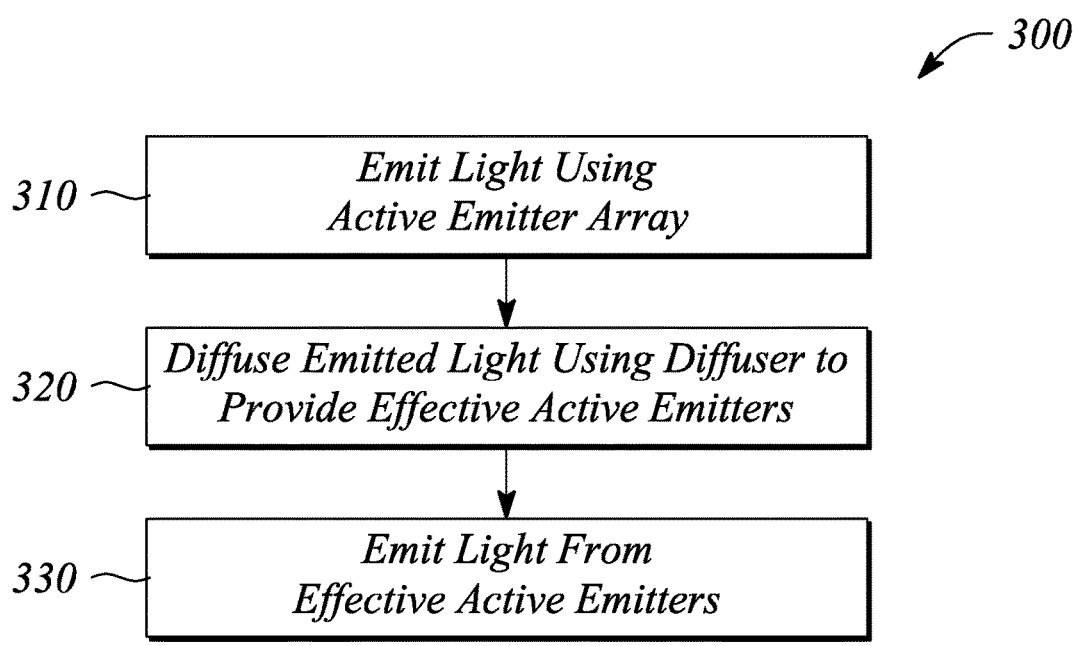
FIG. 5 illustrates a flow chart of a method of multiview backlight operation in an example, according to an embodiment of the principles described herein.

In accordance with some embodiments of the principles described herein, a method of multiview backlight operation is provided. FIG. 5 illustrates a flow chart of a method 300 of multiview backlight operation in an example, according to an embodiment of the principles described herein. The method 300 of multiview backlight operation illustrated in FIG. 5 comprises emitting 310 light using a first array of active emitters disposed across a planar substrate. In some embodiments, the first array of active emitters may be substantially similar to the first array of active emitters 110, described above with respect to the multiview backlight 100. For example, active emitters of the first active emitter array may be spaced apart by a spacing that corresponds to a spacing between multiview pixels of a multiview display.

The method 300 illustrated in FIG. 5 further comprises diffusing 320 the emitted light from each active emitter of the first active emitter array using a diffuser to provide an effective active emitter corresponding to each active emitter. In some embodiments, the diffuser used in diffusing 320 may be substantially similar to the diffuser 120 described above with respect to the multiview backlight 100. In particular, the diffuser may provide the effective active emitter having a size that is between one quarter and two times a size of a light valve of the multiview display. In other embodiments, the effective active emitter size may be between about fifty percent and one hundred fifty percent of the light valve size. In yet other embodiments, the effective emitter size may be comparable or even about equal to the light valve size.

The method 300 of multiview backlight operation illustrated in FIG. 5 further comprises emitting 330 light from the effective active emitters. In some embodiments, the light emitted 330 by the effective active emitters may comprise a plurality of directional light beams having directions corresponding to view directions of a multiview image or equivalently of a multiview display that provide the multiview image. The plurality of directional light beams may be or represent a lightfield, for example.

In some embodiments, active emitters of the first active emitter array are arranged in a 2D array, e.g., in rows and columns of spaced-apart active emitters as illustrated in and described above with respect to FIG. 2B. In other embodiments, active emitters of the first active emitter array are arranged in parallel columns across the substrate, e.g., as illustrated in and described above with respect to FIG. 2C. In these embodiments, the size of effective active emitters provided by the diffuser is in or corresponds to a width direction across the parallel columns. In some embodiments, the diffuser may provide another size of the effective active emitters along a length of the columns that is comparable to a spacing between active emitters along the length of the column.

In some embodiments (not illustrated), the method 300 of multiview backlight operation further comprises emitting light using a second array of active emitters. In these embodiments, the second active emitter array comprises active emitters disposed between the active emitters of the first active emitter array. Further, the diffuser provides emitted light from the light emitted by active emitters of the second active emitter array, in these embodiments. In some embodiments, the active emitters of the first active emitter array emit light during a multiview mode of the multiview backlight and active emitters of both the first and second active emitter array emit light during a two-dimensional (2D) mode of the multiview backlight.

In some embodiments (not illustrated), a method of multiview display operation is provided. The method of multiview display operation comprises the method 300 of multiview backlight operation. The method of multiview display operation further comprises modulating the emitted light from each of the effective active emitters of the first array of active emitters. According to various embodiments, the emitted light from each of the effective active emitters during the multiview mode may comprise a plurality of directional light beams having directions corresponding to view directions of the multiview display. Modulating the emitted light during the multiview mode or equivalently when the second active emitter array is not present provides a multiview image having views in the view directions, according to various embodiments.

In some embodiments (not illustrated), the method of display operation further comprises modulating combined emitted light from effect active emitters provided by the diffuser from light emitted by active emitters of both of the first and second arrays of active emitters during the 2D mode. Modulating the combined emitted light may provide a 2D image, according to various embodiments.

Thus, there have been described examples and embodiments of a multiview backlight, a multiview display, and a method of operating a multiview backlight that employ a diffuser to provide effective active emitters using light emitted by an array of active emitters. It should be understood that the above-described examples are merely illustrative of some of the many specific examples that represent the principles described herein. Clearly, those skilled in the art can readily devise numerous other arrangements without departing from the scope as defined by the following claims.

The invention claimed is:

1. A multiview backlight comprising:
a first array of active emitters disposed across a planar substrate and configured to provide emitted light; and
a diffuser configured to provide an effective active emitter using the emitted light from each active emitter of the first active emitter array, the effective active emitters being configured to emit light,
wherein active emitters of the first active emitter array are spaced apart by a spacing that corresponds to a spacing between multiview pixels of a multiview display, and wherein the diffuser is configured to provide effective active emitters having a predetermined size that is between one quarter and two times a size of a light valve of the multiview display.

2. The multiview backlight of claim 1, wherein active emitters of the first active emitter array are arranged in parallel columns across the substrate, the predetermined size of the effective active emitters provided by the diffuser being in a width direction across the parallel columns.

3. The multiview backlight of claim 2, wherein the diffuser is configured to provide another size of the effective active emitters along a length of the parallel columns that is comparable to a spacing between active emitters along the length of the parallel columns.

4. The multiview backlight of claim 1, further comprising second array of active emitters, the second active emitter array having active emitters disposed between the active emitters of the first active emitter array, wherein the diffuser is configured to diffuse light that is emitted by active emitters of the second active emitter array.

5. The multiview backlight of claim 4, wherein the active emitters of the second active emitter array are disposed halfway between the active emitters of the first active emitter array.

6. The multiview backlight of claim 4, wherein the active emitters of the first active emitter array are configured to provide emitted light during a multiview mode of the multiview backlight and active emitters of both the first active emitter array and the second active emitter array are configured to provide emitted light during a two-dimensional (2D) mode of the multiview backlight.

7. The multiview backlight of claim 4, wherein active emitters of the second active emitter array are spaced apart from one another by a distance corresponding to a spacing of light valves of a light valve array of the multiview display.

8. A multiview display comprising the multiview backlight of claim 1, the multiview display further comprising an array of light valves, light valves of the light valve array being configured to modulate the emitted light from each of the effective active emitters.

9. The multiview display of claim 8, wherein the emitted light from each of the effective active emitters comprises a plurality of directional light beams having directions corresponding to view directions of the multiview display, the light valves being configured to modulate directional light beams of the directional light beam plurality to provide a multiview image having different views in each of the view directions.

10. A multiview display comprising:
an array of effective active emitters, each effective active emitter of the effective active emitter array comprising an active emitter on a planar substrate configured to emit light and a diffuser configured to diffuse the emitted light from the active emitter and to provide output emitted light; and
an array of light valves configured to modulate the output emitted light from the effective active emitter array and provide a displayed image,
wherein diffuser is configured to determine a size of the effective active emitter to be between one quarter and two times a size of a light valve of the light valve array, and wherein a spacing between effective active emitters is an integer multiple of a spacing between light valves of the light valve array.

11. The multiview display of claim 10, wherein the effective active emitter array comprises a first set of effective active emitters spaced apart from one another by a distance corresponding to a spacing between multiview pixels of the multiview display, each of the effective active emitters of the first set being configured to provide output emitted light comprising a plurality of directional light beams having directions corresponding to view directions of the multiview display and the displayed image provided by the modulation of the output emitted light from the first set being a multiview image.

12. The multiview display of claim 11, further comprising a second set of effective active emitters between the effective active emitters of the first set, the displayed image provided by modulation of the output emitted light provided by a combination of the first and second sets of effective active emitters being a two-dimensional (2D) image.

13. The multiview display of claim 12, wherein the effective active emitters of the second set are spaced apart from one another and adjacent to the effective active emitters of the first set by a spacing corresponding to the spacing of light valves of the light valve array.

14. The multiview display of claim 10, wherein effective active emitters of the effective active emitter array are arranged in parallel columns across the planar substrate, the size of effective active emitters being in a width direction across the parallel columns, and wherein the diffuser is configured to determine another size of the effective active emitters along a length of the parallel columns that is comparable to a spacing between active emitters along the length of the parallel columns.

15. The multiview display of claim 10, wherein the active emitter of each effective active emitter comprises a micro light emitting diode (µLED).

16. A method of multiview backlight operation, the method comprising:
- emitting light using a first array of active emitters disposed across a planar substrate;
- diffusing light emitted from each active emitter of the first active emitter array using a diffuser to provide an effective active emitter corresponding to each active emitter; and
- emitting light from the effective active emitters,
- wherein active emitters of the first active emitter array are spaced apart by a spacing that corresponds to a spacing between multiview pixels of a multiview display, and wherein the diffuser provides the effective active emitter having a size that is between one quarter and two times a size of a light valve of the multiview display.

17. The method of multiview backlight operation of claim 16, wherein active emitters of the first active emitter array are arranged in parallel columns across the substrate, the size of effective active emitters provided by the diffuser being in a width direction across the parallel columns, and wherein the diffuser provides another size of the effective active emitters along a length of the parallel columns that is comparable to a spacing between active emitters along the length of the parallel columns.

18. The method of multiview backlight operation of claim 16, the method further comprising emitting light using a second array of active emitters, the second active emitter array comprising active emitters disposed between the active emitters of the first active emitter array, wherein the diffuser provides emitted light from the light emitted by active emitters of the second active emitter array.

19. The method of multiview backlight operation of claim 18, wherein the active emitters of the first active emitter array emit light during a multiview mode of the multiview backlight and active emitters of both the first and second active emitter array emit light during a two-dimensional (2D) mode of the multiview backlight.

20. A method of multiview display operation comprising the method of multiview backlight operation of claim 16, the method of multiview display operation further comprising modulating the emitted light from each of the effective active emitters to provide a multiview image having views in the view directions, the emitted light comprising a plurality of directional light beams having directions corresponding to view directions of the multiview image.

* * * * *